US012673393B2

(12) United States Patent
Yamaoka et al.

(10) Patent No.: US 12,673,393 B2
(45) Date of Patent: Jul. 7, 2026

(54) MACHINE FOR STORING IN-MACHINING INFORMATION AND A COMPARISON RESULT

(71) Applicant: FANUC CORPORATION, Yamanashi (JP)

(72) Inventors: Masahide Yamaoka, Yamanashi-ken (JP); Meguru Yamaguchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 627 days.

(21) Appl. No.: 18/010,567

(22) PCT Filed: Jun. 21, 2021

(86) PCT No.: PCT/JP2021/023283
§ 371 (c)(1),
(2) Date: Dec. 15, 2022

(87) PCT Pub. No.: WO2021/261409
PCT Pub. Date: Dec. 30, 2021

(65) Prior Publication Data
US 2023/0256555 A1     Aug. 17, 2023

(30) Foreign Application Priority Data
Jun. 25, 2020     (JP) ................................. 2020-109682

(51) Int. Cl.
*B23Q 17/20* (2006.01)
*B23H 7/04* (2006.01)
(Continued)

(52) U.S. Cl.
CPC .............. *B23Q 17/20* (2013.01); *B23H 7/04* (2013.01); *B23H 11/00* (2013.01); *B23Q 17/09* (2013.01); *B23Q 2717/00* (2013.01)

(58) Field of Classification Search
CPC .... B23Q 17/20; B23Q 17/09; B23Q 2717/00; B23H 7/04; B23H 11/00; B23H 7/20;
(Continued)

(56) References Cited

U.S. PATENT DOCUMENTS 6,600,125 B1     7/2003  Boccadoro et al.
6,750,884 B1 *   6/2004  Steigerwald ........... G09B 19/00
                                                    715/762
(Continued)

FOREIGN PATENT DOCUMENTS

CN         1112469 A      11/1995
CN         1115703 A       1/1996
(Continued)

OTHER PUBLICATIONS

International Search Report issued by the Japanese Patent Office acting as the International Searching Authority in relation to International Application No. PCT/JP2021/023283 dated Aug. 31, 2021 (3 pages) along with English language translation (2 pages).
(Continued)

*Primary Examiner* — Eric J Yoon
(74) *Attorney, Agent, or Firm* — Carter, DeLuca & Farrell, LLP; Stephen DiLorenzo

(57) ABSTRACT

A processing machine is provided which can accurately evaluate the results of periodic inspection. This processing machine, for processing a workpiece, is provided with: an information storage unit which, as reference information, stores information that includes multiple pieces of in-process information, which indicate the processing state when the workpiece was subjected to inspection processing, and processing result information, which has been obtained by measuring the product obtained by the inspection processing; an acquisition unit which acquires comparison information, which includes the processing result information
(Continued)

| | | 96A | 96B | |
|---|---|---|---|---|
| | | memory #0 | memory #1 | |
| WIRE ELECTRODE | MATERIAL | OOO | OOO | ←79A |
| | DIAMETER | OOO | OOO | ←79B |
| OBJECT TO BE MACHINED | MATERIAL | OOO | XXX | ←79C |
| | THICKNESS | OOO | OOO | ←79D |
| MACHINING PROGRAM | | OOO | OOO | ←79E |
| MACHINING CONDITIONS | | OOO | OOO | ←79F |
| PERSON IN CHARGE | | OOO | XXX | ←79G |
| MACHINING VOLTAGE | | OOO[V] | OOO[V] | ←85A |
| MACHINING CURRENT | | OOO[A] | XXX[A] | ←85B |
| MACHINING SPEED | | OOO[mm/min] | XXX[mm/min] | ←85C |
| MACHINING TEMPERATURE | | OOO[°C] | OOO[°C] | ←85D |
| DIELECTRIC WORKING FLUID PRESSURE | | OOO[MPa] | OOO[MPa] | ←85E |
| RESISTIVITY | | OOO[Ω·m] | OOO[Ω·m] | ←85F |
| MACHINING TIME | | OOO[min] | OOO[min] | ←85G |
| MACHINING DATE AND TIME | | YYMMDDHHMMSS1 | YYMMDDHHMMSS2 | ←85H |
| DIMENSIONS | | OOO[mm] | XXX[mm] | ←87A |
| STRAIGHTNESS | | OOO[mm] | OOO[mm] | ←87B |
| SURFACE ROUGHNESS | | OOO[μm] | XXX[μm] | ←87C |

97A   97B and the multiple pieces of in-process information in inspection processing that was carried out after the inspection processing for which the reference information was acquired; a comparison unit which compares the comparison information and the reference information; and a display control unit which displays on a display unit the results of comparison by the comparison unit.

11 Claims, 10 Drawing Sheets

(51) Int. Cl.
  *B23H 11/00*          (2006.01)
  *B23Q 17/09*          (2006.01)
(58) Field of Classification Search
  CPC .. B23H 7/02; G05B 19/4063; G05B 19/4065; G05B 2219/45043; G05B 2219/45221; G05B 23/0283; G05B 23/0272; G05B 2219/32128; G05B 19/406; Y02P 90/02; G06F 3/048; G06Q 50/04; G06T 11/206; G06T 2200/24
  See application file for complete search history.

(56)                References Cited

U.S. PATENT DOCUMENTS

| | | | | |
|---|---|---|---|---|
| 2017/0205804 | A1* | 7/2017 | Kuroki | G05B 19/4063 |
| 2017/0228108 | A1* | 8/2017 | Marsolek | G07C 5/008 |
| 2018/0369943 | A1* | 12/2018 | Masuda | B23H 7/26 |
| 2019/0171183 | A1 | 6/2019 | Brambach et al. | |
| 2020/0037919 | A1* | 2/2020 | Kuang | G01R 33/5608 |

| | | | | |
|---|---|---|---|---|
| 2020/0097484 | A1* | 3/2020 | Block | G06F 16/951 |
| 2021/0165853 | A1* | 6/2021 | Murayama | G06F 17/17 |
| 2022/0187792 | A1* | 6/2022 | Regulin | G05B 19/404 |

FOREIGN PATENT DOCUMENTS

| | | | |
|---|---|---|---|
| CN | 1765555 | A | 5/2006 |
| CN | 101121211 | B | 1/2011 |
| CN | 107855617 | A | 3/2018 |
| CN | 110125726 | A | 8/2019 |
| EP | 0663257 | A2 | 7/1995 |
| JP | 61-111854 | A | 5/1986 |
| JP | S62121550 | A | 6/1987 |
| JP | H02071961 | A | 3/1990 |
| JP | H02279217 | A | 11/1990 |
| JP | 2005001033 | A | 1/2005 |
| JP | 3856603 | B2 | 12/2006 |
| JP | 2014174680 | A | 9/2014 |
| JP | 2017068630 | A | 4/2017 |
| JP | 2020057090 | A | 4/2020 |
| TW | 201111079 | A | 4/2011 |
| WO | 9301018 | A1 | 1/1993 |

OTHER PUBLICATIONS

Written Opinion of the International Searching Authority issued by the Japanese Patent Office acting as the International Searching Authority in relation to International Application No. PCT/JP2021/023283 dated Aug. 31, 2021 (3 pages).
Extended Search Report for European Application No. 21829910.5, Jul. 23, 2024, 10 pages.
Notification of Granting a Patent Right with Search Report for Chinese Patent Application No. 202180045125.4 dated Sep. 1, 2025 with English translation.

* cited by examiner

|  |  | 77 |  |
|---|---|---|---|
| WIRE ELECTRODE | MATERIAL | OOO | ← 79A |
|  | DIAMETER | OOO | ← 79B |
| OBJECT TO BE MACHINED | MATERIAL | OOO | ← 79C |
|  | THICKNESS | OOO | ← 79D |
| MACHINING PROGRAM |  | OOO | ← 79E |
| MACHINING CONDITIONS |  | OOO | ← 79F |
| PERSON IN CHARGE |  | OOO | ← 79G |

| MACHINING VOLTAGE | OOO | [V] | ← 85A |
|---|---|---|---|
| MACHINING CURRENT | OOO | [A] | ← 85B |
| MACHINING SPEED | OOO | [mm/min] | ← 85C |
| MACHINING TEMPERATURE | OOO | [°C] | ← 85D |
| DIELECTRIC WORKING FLUID PRESSURE | OOO | [MPa] | ← 85E |
| RESISTIVITY | OOO | [Ω·m] | ← 85F |
| MACHINING TIME | OOO | [min] | ← 85G |
| MACHINING DATE AND TIME | OOO |  | ← 85H |

| DIMENSIONS | 95 ⌐ OOO | [mm] | ← 87A |
|---|---|---|---|
| STRAIGHTNESS | OOO | [mm] | ← 87B |
| SURFACE ROUGHNESS | OOO | [μm] | ← 87C |

SAVE ⌐ 89

FIG. 6

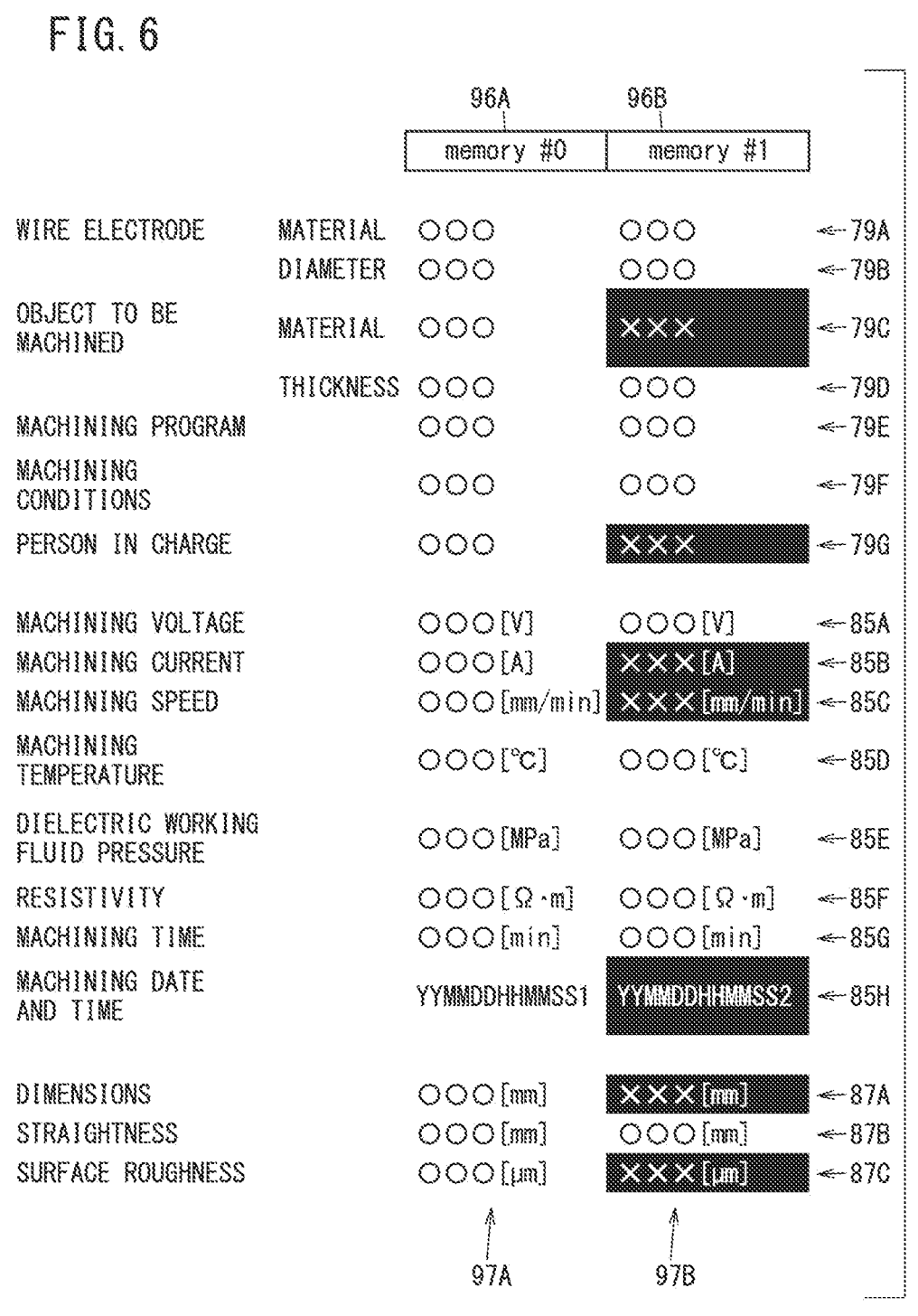

| | | memory #0 96A | memory #1 96B | |
|---|---|---|---|---|
| WIRE ELECTRODE | MATERIAL | ○○○ | ○○○ | ←79A |
| | DIAMETER | ○○○ | ○○○ | ←79B |
| OBJECT TO BE MACHINED | MATERIAL | ○○○ | ×××  | ←79C |
| | THICKNESS | ○○○ | ○○○ | ←79D |
| MACHINING PROGRAM | | ○○○ | ○○○ | ←79E |
| MACHINING CONDITIONS | | ○○○ | ○○○ | ←79F |
| PERSON IN CHARGE | | ○○○ | ×××  | ←79G |
| MACHINING VOLTAGE | | ○○○[V] | ○○○[V] | ←85A |
| MACHINING CURRENT | | ○○○[A] | ×××[A] | ←85B |
| MACHINING SPEED | | ○○○[mm/min] | ×××[mm/min] | ←85C |
| MACHINING TEMPERATURE | | ○○○[℃] | ○○○[℃] | ←85D |
| DIELECTRIC WORKING FLUID PRESSURE | | ○○○[MPa] | ○○○[MPa] | ←85E |
| RESISTIVITY | | ○○○[Ω·m] | ○○○[Ω·m] | ←85F |
| MACHINING TIME | | ○○○[min] | ○○○[min] | ←85G |
| MACHINING DATE AND TIME | | YYMMDDHHMMSS1 | YYMMDDHHMMSS2 | ←85H |
| DIMENSIONS | | ○○○[mm] | ×××[mm] | ←87A |
| STRAIGHTNESS | | ○○○[mm] | ○○○[mm] | ←87B |
| SURFACE ROUGHNESS | | ○○○[μm] | ×××[μm] | ←87C |
| | | ↑ 97A | ↑ 97B | |

| DIFFERENCE BETWEEN REFERENCE INFORMATION AND COMPARISON INFORMATION | PORTION REQUIRING MAINTENANCE OR CHECKING |
|---|---|
| MACHINING VOLTAGE | |
| MACHINING CURRENT | |
| MACHINING SPEED | |
| MACHINING TEMPERATURE | |
| DIELECTRIC WORKING FLUID PRESSURE | |
| RESISTIVITY | |
| MACHINING TIME | |

FIG. 10

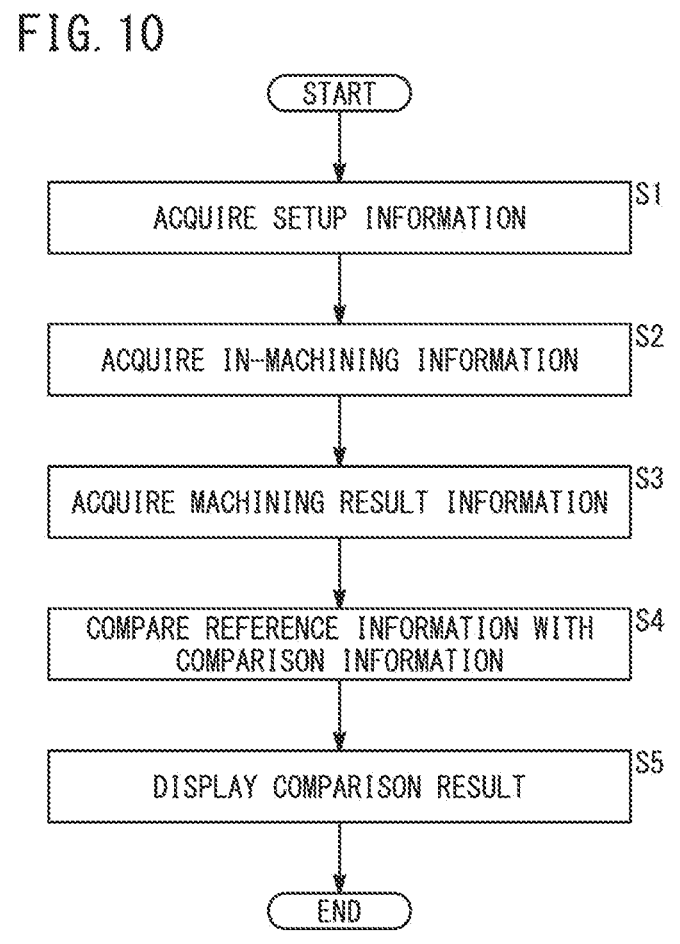

```
              ( START )
                  |
                  v
    +---------------------------------+ S1
    |   ACQUIRE SETUP INFORMATION     |
    +---------------------------------+
                  |
                  v
    +---------------------------------+ S2
    |  ACQUIRE IN-MACHINING INFORMATION |
    +---------------------------------+
                  |
                  v
    +---------------------------------+ S3
    | ACQUIRE MACHINING RESULT INFORMATION |
    +---------------------------------+
                  |
                  v
    +---------------------------------+ S4
    | COMPARE REFERENCE INFORMATION WITH |
    |       COMPARISON INFORMATION    |
    +---------------------------------+
                  |
                  v
    +---------------------------------+ S5
    |    DISPLAY COMPARISON RESULT    |
    +---------------------------------+
                  |
                  v
              ( END )
```

MACHINE FOR STORING IN-MACHINING INFORMATION AND A COMPARISON RESULT

CROSS-REFERENCE TO RELATED APPLICATIONS

This application is a national phase entry under 35 U.S.C. 371 of PCT International Application No. PCT/JP2021/023283, filed Jun. 21, 2021, which claims priority to Japanese Patent Application No. 2020-109682, filed Jun. 25, 2020, the disclosure of each of these applications is expressly incorporated herein by reference in their entirety.

TECHNICAL FIELD

The present invention relates to a processing machine that machines an object to be machined.

BACKGROUND ART

In JP 3856603 B2, a wire electrical discharge machine is disclosed that machines a workpiece by applying a pulse voltage to a machining gap between the wire electrode and the workpiece. When a processing machine such as a wire electrical discharge machine is installed in a factory or the like, adjustment (on-site adjustment) may be performed on the processing machine. Further, after the on-site adjustment is performed, the periodic inspection may be performed on the processing machine every time the periodic inspection time arrives.

SUMMARY OF THE INVENTION

However, conventionally, the result of the periodic inspection or the like cannot always be evaluated accurately.

An object of the present invention is to provide a processing machine capable of accurately evaluating a result of a periodic inspection or the like.

According to one aspect of the present invention, there is provided a processing machine that machines an object to be machined, the processing machine comprising: an information storage unit configured to store, as reference information, information including a plurality of pieces of in-machining information indicating a machining state when inspection machining is performed on the object to be machined, and machining result information obtained by measuring a machined product obtained by the inspection machining; an acquisition unit configured to acquire comparison information including the plurality of pieces of in-machining information and the machining result information that are obtained in the inspection machining executed after the inspection machining in which the reference information has been acquired; a comparison unit configured to compare the comparison information with the reference information; and a display control unit configured to display a comparison result obtained by the comparison unit on a display unit.

According to the present invention, it is possible to provide a processing machine capable of accurately evaluating a result of a periodic inspection or the like.

BRIEF DESCRIPTION OF DRAWINGS

FIG. 3 is a diagram showing an example of a display screen;

FIG. 6 is a diagram showing an example of display of a comparison result;

FIG. 9 is a diagram showing an example of a table; and

FIG. 10 is a flowchart showing operations of the processing machine according to the embodiment.

DETAILED DESCRIPTION OF THE INVENTION

A preferred embodiment of a processing machine according to the present invention will be presented and described in detail below with reference to the accompanying drawings.

Embodiment

Figure 1:
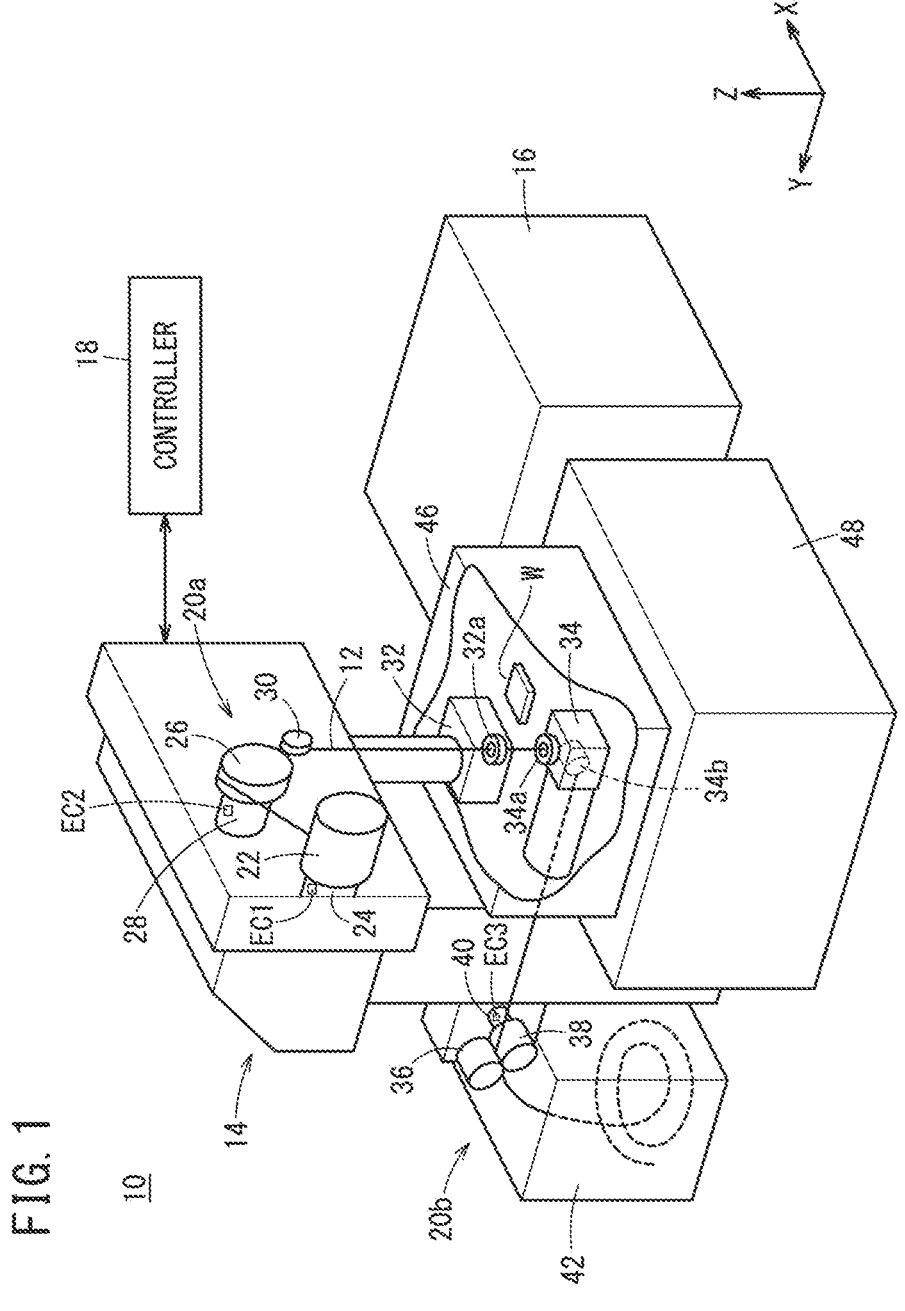
FIG. 1 is a perspective view showing a processing machine according to an embodiment of the present invention.

A processing machine according to an embodiment of the present invention will be described with reference to the drawings. FIG. 1 is a perspective view showing a processing machine according to the embodiment. In this instance, a case in which a processing machine 10 is a wire electrical discharge machine will be described as an example, but the processing machine 10 is not necessarily limited to being a wire electrical discharge machine.

The processing machine 10, and specifically, the wire electrical discharge machine, is a machine tool that applies a voltage to an object to be machined W (see FIG. 1) and a wire electrode 12 in a dielectric working fluid, and generates an electrical discharge in a machining gap formed between the object to be machined W and the wire electrode 12, thereby carrying out electrical discharge machining on the object to be machined W. The processing machine 10 is equipped with a machine main body 14, a dielectric working fluid unit 16, and a controller 18.

The material of the wire electrode 12, for example, is a metal material such as a tungsten-based material, a copper alloy-based material, or a brass-based material. On the other hand, the material of the object to be machined W, for example, is a metal material such as an iron-based material or a super hard material (e.g., tungsten carbide).

The machine main body 14 includes a supply system 20a that supplies the wire electrode (electrode) 12 toward the object to be machined (the workpiece) W, and a collecting system 20b that collects the wire electrode 12 that has passed through the object to be machined W.

A wire bobbin 22, a torque motor 24, and a brake shoe 26 are provided in the supply system 20a. The wire electrode 12, which has not yet been used, is wound around the wire bobbin 22. The torque motor 24 applies a torque to the wire bobbin 22. The brake shoe 26 applies a braking force by friction to the wire electrode 12. A brake motor 28 and a wire guide (upper wire guide) 32 are further provided in the supply system 20a. The brake motor 28 applies a braking torque to the brake shoe 26. The wire guide 32 guides the wire electrode 12 above the object to be machined W.

Encoders EC1 and EC2 for detecting a rotational position or a rotational speed are provided in the torque motor 24 and the brake motor 28, respectively. Based on detection signals detected by the encoders EC1 and EC2, the controller 18 is capable of feedback-controlling the torque motor 24 and the brake motor 28, in a manner so that the rotational speeds of the torque motor 24 and the brake motor 28 become predetermined rotational speeds. It should be noted that the supply system 20a may further be equipped with a tension detector 30 that detects a magnitude of the tension of the wire electrode 12.

A wire guide (lower wire guide) 34, a pinch roller 36, and a feed roller 38 are provided in the collecting system 20b. The wire guide 34 guides the wire electrode 12 below the object to be machined W. The pinch roller 36 and the feed roller 38 are capable of sandwiching the wire electrode 12. The collecting system 20b is further equipped with a torque motor 40 that applies a torque to the feed roller 38. The collecting system 20b is further equipped with a collecting box 42. The used wire electrode 12 which has been conveyed using the pinch roller 36 and the feed roller 38 is collected in the collecting box 42. An encoder EC3 for detecting a rotational position or a rotational speed is provided in the torque motor 40. Based on a detection signal detected by the encoder EC3, the controller 18 is capable of feedback-controlling the torque motor 40, in a manner so that the rotational speed of the torque motor 40 becomes a predetermined rotational speed.

The machine main body 14 is provided with a work pan 46. The work pan 46 is capable of storing a dielectric working fluid such as deionized water or oil used in electrical discharge machining. The work pan 46 is placed on a base portion 48. The wire guides 32 and 34 are arranged inside the work pan 46. The object to be machined W is disposed between the wire guide 32 and the wire guide 34. Die guides 32a and 34a that support the wire electrode 12 are provided respectively in the wire guides 32 and 34. In addition, a guide roller 34b is further provided in the wire guide 34. The guide roller 34b guides the wire electrode 12 to the pinch roller 36 and the feed roller 38 while changing the orientation of the wire electrode 12.

It should be noted that the wire guide 32 ejects a clean dielectric working fluid that does not contain any machining waste (sludge) toward the machining gap formed between the wire electrode 12 and the object to be machined W. Consequently, the machining gap can be filled with the clean dielectric working fluid suitable for electrical discharge machining. As a result, it is possible to prevent the accuracy of the electrical discharge machining from being lowered by the sludge generated by the electrical discharge machining. Further, the wire guide 34 may also eject a clean dielectric working fluid that does not contain any sludge toward the machining gap.

The object to be machined W is supported by a non-illustrated machining table that is movable in the X direction and the Y direction. The wire guides 32 and 34, the object to be machined W, and the machining table are immersed in the dielectric working fluid that is stored in the work pan 46.

In the case that a start hole or a machined groove serving as a start point for the electrical discharge machining is formed in the object to be machined W, the wire electrode 12 is inserted through the start hole or the machined groove, and the wire electrode 12 is connected. In such a case, a gap between the start hole or the machined groove of the object to be machined W and the wire electrode 12 becomes the machining gap. After the wire electrode 12 has been inserted through the start hole or the machined groove of the object to be machined W and connected, the processing machine 10 causes the machining table (and the object to be machined W) to be moved in a plane parallel to the XY plane, while feeding out the wire electrode 12 in a downward direction (the −Z direction) toward the object to be machined W. As a result, machining is carried out on the object to be machined W. The phrase "connection of the wire electrode 12" implies that the wire electrode 12 that is wound around the wire bobbin 22 is passed through the wire guide 32, the object to be machined W, and the wire guide 34, and is sandwiched by the pinch roller 36 and the feed roller 38. In the case that the wire electrode 12 is connected, a predetermined amount of tension is applied to the wire electrode 12. It should be noted that the X direction and the Y direction are perpendicular to each other, and the direction perpendicular to the XY plane (the horizontal plane) is defined as a Z direction. Moreover, it should be noted that the start hole or the machined groove that serves as the start point of the electrical discharge machining is not limited to being formed in the object to be machined W. For example, there may also be a case in which the machining (cutting) is initiated from an end surface of the object to be machined W. In such a case, the machining can be initiated from the end surface of the object to be machined W, without inserting the wire electrode 12 through the start hole or the machined groove.

The dielectric working fluid unit 16 is a unit that removes machining waste generated in the work pan 46, and controls the quality of the dielectric working fluid by adjusting the resistivity (the electrical resistivity), the temperature, and the like. The dielectric working fluid whose quality has been controlled by the dielectric working fluid unit 16 is returned to the work pan 46 again. At least a part of the dielectric working fluid returned to the work pan 46 is ejected from the wire guide 32 and returned to the work pan 46. The controller 18 is capable of controlling the machine main body 14 and the dielectric working fluid unit 16.

Figure 2:
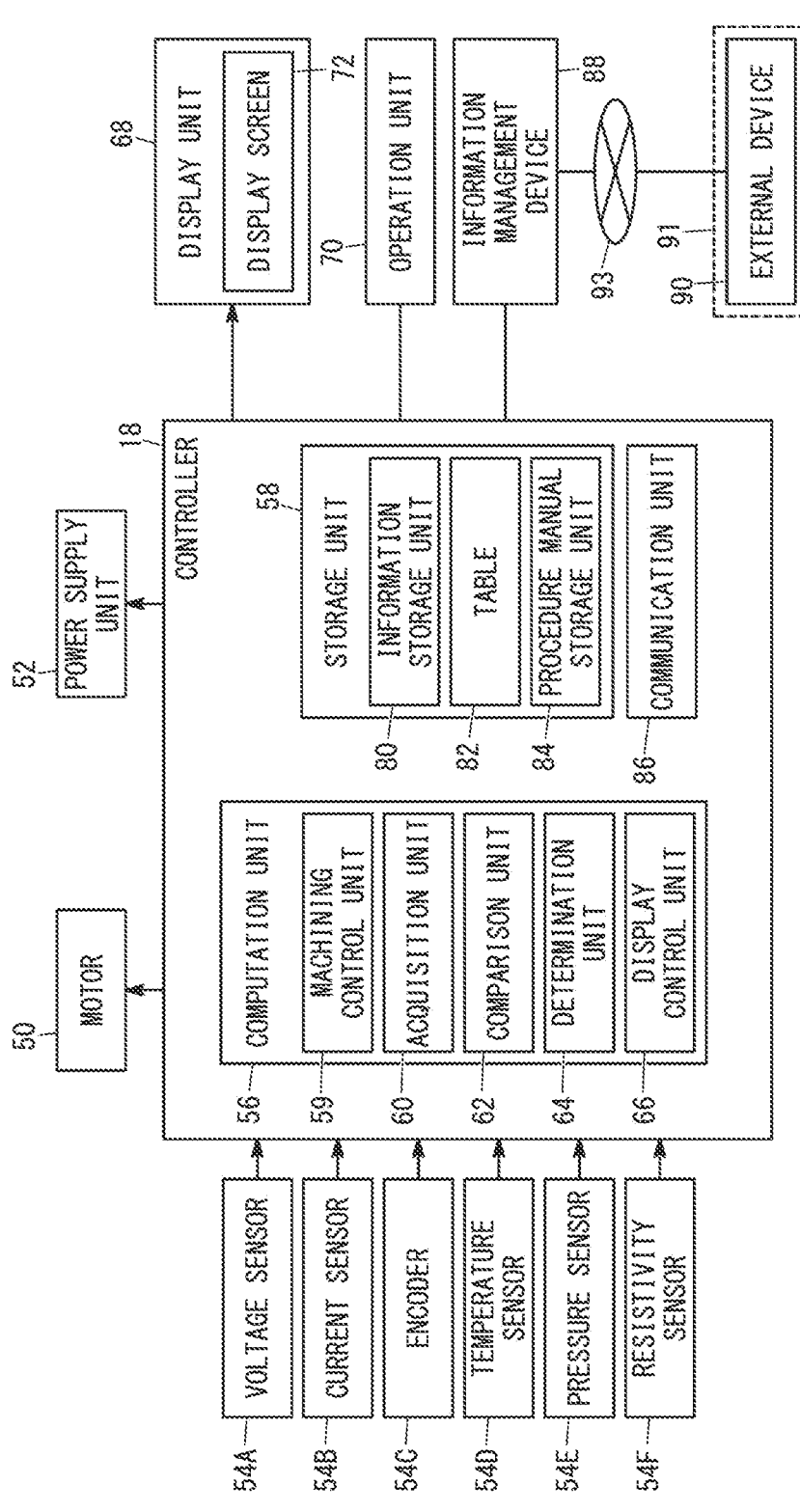
FIG. 2 is a block diagram showing a part of the processing machine according to the embodiment.

FIG. 2 is a block diagram showing a part of the processing machine according to the present embodiment.

As shown in FIG. 2, the machine main body 14 (see FIG. 1) includes a motor 50. The motor 50 serves to move the wire electrode 12 and the object to be machined W relative to each other. As the motor 50, for example, a servo motor can be used, but the motor 50 is not limited thereto. Although a plurality of the motors 50 are provided in the machine main body 14, one of the motors 50 is illustrated in FIG. 2 for simplification of description.

The machine main body 14 further includes a power supply unit 52. The power supply unit 52 repeatedly applies a voltage pulse to the object to be machined W and the wire electrode 12 based on a control signal supplied from the controller 18. It should be noted that, as was described previously with reference to FIG. 1, the machine main body 14 is equipped with constituent elements other than these constituent elements, but only a portion of the constituent elements are shown in FIG. 2.

The processing machine 10 further includes a voltage sensor 54A. The voltage sensor 54A can detect a voltage in the machining gap (machining gap voltage). Information indicative of the machining gap voltage detected by the voltage sensor 54A can be supplied to the controller 18.

The processing machine 10 further includes a current sensor 54B. The current sensor 54B can detect a current flowing through the machining gap. Information indicative of the current detected by the current sensor 54B can be supplied to the controller 18.

The processing machine 10 further includes an encoder 54C. The encoder 54C is provided in the motor 50. The encoder 54C may be an absolute encoder or an incremental encoder. Information detected by the encoder 54C can be supplied to the controller 18.

The processing machine 10 further includes a temperature sensor 54D. The temperature sensor 54D can detect the temperature of the dielectric working fluid. Information indicative of the temperature detected by the temperature sensor 54D can be supplied to the controller 18.

The processing machine 10 further includes a pressure sensor 54E. The pressure sensor 54E can detect the pressure of the dielectric working fluid. Information indicative of the pressure detected by the pressure sensor 54E can be supplied to the controller 18.

The processing machine 10 further includes a resistivity sensor 54F. The resistivity sensor 54F can detect the resistivity of the dielectric working fluid. Information indicative of the resistivity detected by the resistivity sensor 54F can be supplied to the controller 18.

In this way, the processing machine 10 includes a plurality of types of sensors 54A to 54F. The reference numeral 54 is used when describing the sensors in general, and the reference numerals 54A to 54F are used when describing the individual sensors.

The controller 18 controls the processing machine 10 as a whole. The controller 18 is equipped with a computation unit 56, a storage unit 58, and a communication unit 86. The computation unit 56 may be constituted, for example, by a processor such as a CPU (Central Processing Unit), but the present invention is not limited thereto. In the storage unit 58, for example, a non-illustrated volatile memory, and a non-illustrated non-volatile memory are provided. As examples of the volatile memory, there may be cited a RAM (Random Access Memory) or the like. As examples of the nonvolatile memory, there may be cited a ROM (Read Only Memory), a flash memory, or the like. Programs, data, and the like can be stored in the storage unit 58. The communication unit 86 serves to carry out communications with an information management device 88, an external device 90, or the like, which will be described later.

The computation unit 56 includes a machining control unit 59, an acquisition unit 60, a comparison unit 62, a determination unit 64, and a display control unit 66. The machining control unit 59, the acquisition unit 60, the comparison unit 62, the determination unit 64, and the display control unit 66 can be realized by the computation unit 56 executing programs stored in the storage unit 58.

The storage unit 58 is equipped with an information storage unit 80, a table 82, and a procedure manual storage unit 84.

Setup information 79A to 79G (see FIG. 3) described later can be stored in the information storage unit 80. The reference numeral 79 is used when describing the setup information in general, and the reference numerals 79A to 79G are used when describing the individual setup information. Further, in-machining information 85A to 85H (see FIG. 3) described later can be stored in the information storage unit 80. The reference numeral 85 is used when describing the in-machining information in general, and the reference numerals 85A to 85H are used when describing the individual in-machining information. Machining result information 87A to 87C (see FIG. 3) described later can be stored in the information storage unit 80. The reference numeral 87 is used when describing the machining result information in general, and the reference numerals 87A to 87C are used when describing the individual machining result information.

In the table 82, as will be described later, a portion requiring maintenance or checking is defined in accordance with a difference between reference information 97A (see FIG. 6) and comparison information 97B (see FIG. 6).

The procedure manual storage unit 84 electronically stores a procedure manual used when inspection machining is performed.

The processing machine 10 further includes a display unit (display device) 68. The display unit 68 may be constituted, for example, by a liquid crystal display or the like, but the present invention is not limited thereto. The display unit 68 is equipped with a display screen 72. The display of the display unit 68 can be controlled by the display control unit 66.

The processing machine 10 further includes an operation unit 70. The operation unit 70 may be configured, for example, by a touch panel, a keyboard, a mouse, or the like, none of which are shown. The touch panel can be provided on the display screen 72 of the display unit 68. An operator can provide instructions to the controller 18 by operating the operation unit 70. The operator, for example, by operating the touch panel, the mouse, or the like, is capable of selecting a selection button, an icon, or the like.

The machining control unit 59 performs electrical discharge machining on the object to be machined W by appropriately controlling the motor 50, the power supply unit 52, and the like, based on preset machining conditions, a machining program, and various pieces of information fed back by the sensor 54.

When the inspection machining is performed, the operator inputs the setup information 79 which is information about setup of the inspection machining. The operator inputs the setup information 79 in a state where an operation screen for inputting the setup information 79 is displayed on the display unit 68. FIG. 3 is a diagram showing an example of the display screen. As shown in FIG. 3, input boxes (text boxes) 77 for inputting the setup information 79 can be displayed on the display screen 72 of the display unit 68. The operator can input the setup information 79 to the input box 77 by operating the operation unit 70. Although an example in which the input boxes 77 are displayed is shown in this instance, a pull-down list may be displayed. At the stage of inputting the setup information 79, the in-machining information 85 and the machining result information 87 are not acquired. Therefore, at the stage of inputting the setup information 79, the fields of the in-machining information 85 and the machining result information 87 are blank.

As shown in FIG. 3, the setup information 79 includes, for example, information 79A and 79B about the wire electrode 12 used for inspection machining. The setup information 79 includes, for example, information 79C and 79D about the object to be machined W. The setup information 79 includes, for example, information 79E indicating a machining program used for the inspection machining. The setup information 79 includes, for example, information 79F indicating machining conditions when the inspection machining is performed. The setup information 79 includes, for example, information 79G indicating a person in charge of the inspection machining. Examples of the information 79A about the wire electrode 12 include the information 79A about the material of the wire electrode 12. Examples of the information 79B about the wire electrode 12 include the information 79B about the diameter of the wire electrode 12. Examples of the information 79C about the object to be machined W include the information 79C about the material of the object to be machined W. Examples of the information 79D about the object to be machined W include the information 79D about the thickness of the object to be machined W. The setup information 79 is not limited to these examples. Further, as described above, the procedure manual used when the inspection machining is performed is electronically stored in the procedure manual storage unit 84. The operator can input the setup information 79 while appropriately referring to this procedure manual. The acquisition unit 60 can acquire the setup information 79 input in this manner. After the input of the setup information 79 is completed, the operator presses a save button 89. When the save button 89 is pressed, the acquisition unit 60 stores the acquired setup information 79 in the information storage unit 80.

The on-site adjustment is performed when the processing machine 10 is installed in a factory or the like. Installation of the processing machine 10 in the factory or the like is normally performed by a person of the manufacturer of the processing machine 10. Therefore, the operator of the inspection work performed at the time of field work is the person of the manufacturer. On the other hand, the periodic inspection is normally performed by a user of the processing machine 10, and a person of the manufacturer of the processing machine 10 does not attend the periodic inspection.

Setup is performed respectively in the inspection machining performed at the time of on-site adjustment or the like, and in the inspection machining performed at the time of periodic inspection or the like. When the contents of the setup at the time of the periodic inspection or the like are different from the contents of the setup at the time of the on-site adjustment or the like, a difference may occur in the machining state at the time of the inspection machining, and thus a machined product obtained by the inspection machining may be affected. Therefore, in order to accurately evaluate the result of the periodic inspection or the like, it is preferable that the contents of the setup of the inspection machining performed at the time of the on-site adjustment or the like are the same as the contents of the setup of the inspection machining performed at the time of the periodic inspection or the like. However, there may be a difference between the contents of the setup of the inspection machining performed at the time of the on-site adjustment or the like, and the contents of the setup of the inspection machining performed at the time of the periodic inspection or the like.

Inspection machining is performed after the setup of the inspection machining is completed. During the inspection machining, the acquisition unit 60 acquires the in-machining information 85. The in-machining information 85 is information indicating a machining state when inspection machining is performed on the object to be machined W. The in-machining information 85 can be automatically acquired by the acquisition unit 60 based on the information supplied from the various sensors 54. As shown in FIG. 3, the in-machining information 85 includes, for example, information 85A about a machining voltage. The in-machining information 85 includes, for example, information 85B about a machining current. The in-machining information 85 includes, for example, information 85C about a machining speed. The in-machining information 85 includes, for example, information 85D about a machining temperature. The in-machining information 85 includes, for example, information 85E about a dielectric working fluid pressure. The in-machining information 85 includes, for example, information 85F about resistivity. The in-machining information 85 includes, for example, information 85G about a machining time. The in-machining information 85 includes, for example, information 85H about a machining date and time.

The machining voltage is a voltage applied between the object to be machined W and the wire electrode 12. The machining voltage can be acquired by the acquisition unit 60 based on the information supplied from the voltage sensor 54A. For example, the average voltage per unit time when a predetermined portion of the object to be machined W is machined can be acquired as the machining voltage by the acquisition unit 60.

The machining current is a current that flows when an electrical discharge occurs between the object to be machined W and the wire electrode 12. The machining current can be acquired by the acquisition unit 60 based on the information supplied from the current sensor 54B. For example, the average current per unit time when a predetermined portion of the object to be machined W is machined can be acquired as the machining current by the acquisition unit 60.

The machining speed is a machining speed when inspection machining is performed on the object to be machined W. The machining speed can be acquired by the acquisition unit 60 based on the information supplied from the encoder 54C. For example, the machining speed when a predetermined portion of the object to be machined W is machined can be acquired by the acquisition unit 60.

The machining temperature is the temperature of the dielectric working fluid. The machining temperature can be acquired by the acquisition unit 60 based on the information supplied from the temperature sensor 54D. For example, the average value of the machining temperature from the start to the end of the inspection machining performed on the object to be machined W can be acquired as the machining temperature by the acquisition unit 60, but the present invention is not limited thereto.

The dielectric working fluid pressure is the fluid pressure of the dielectric working fluid. The dielectric working fluid pressure can be acquired by the acquisition unit 60 based on the information supplied from the pressure sensor 54E. For example, the average value of the dielectric working fluid pressure from the start to the end of the inspection machining performed on the object to be machined W can be acquired as the dielectric working fluid pressure by the acquisition unit 60, but the present invention is not limited thereto.

The resistivity is the resistivity of the dielectric working fluid. The resistivity can be acquired by the acquisition unit 60 based on the information supplied from the resistivity sensor 54F. For example, the average value of the resistivity of the dielectric working fluid from the start to the end of the inspection machining performed on the object to be machined W can be acquired as the resistivity by the acquisition unit 60, but the present invention is not limited thereto.

The machining time is the time required for inspection machining of the object to be machined W. The machining date and time is the date and time when the inspection machining was performed on the object to be machined W. Note that the in-machining information 85 is not limited to these. After the inspection machining is finished, the operator presses the save button 89. When the save button 89 is pressed, the acquisition unit 60 stores the acquired in-machining information 85 in the information storage unit 80.

After the inspection machining is performed, the operator inputs machining result information 87 which is information obtained by measuring a machined product obtained by the inspection machining. The machining result information 87 is obtained by measuring, using a measuring device, a machined product obtained by the inspection machining. In a state where an operation screen for inputting the machining result information 87 is displayed on the display unit 68, the operator inputs the machining result information 87. As shown in FIG. 3, input boxes (text boxes) 95 for inputting the machining result information 87 can be displayed on the display screen 72 of the display unit 68. The operator can input the machining result information 87 to the input box 95 by operating the operation unit 70.

As shown in FIG. 3, the machining result information 87 includes information 87A about dimensions. The machining result information 87 includes information 87B about straightness. The machining result information 87 includes, for example, information 87C about surface roughness. Note that the machining result information 87 is not limited thereto. The straightness is the magnitude of deviation of a rectilinear feature from a geometrically correct straight line. The dimensions of the machined product can be measured using, for example, a micrometer, a non-contact coordinate measuring machine (CMM), a contact coordinate measuring machine, a microscope, or the like. The straightness of the machined product can be measured using, for example, a micrometer, a non-contact coordinate measuring machine, a contact coordinate measuring machine, or the like. The surface roughness of the machined product can be measured using, for example, a surface roughness measuring instrument or the like. Although the case where the machining result information 87 is input by the operator has been described as an example, the present invention is not limited thereto. The machining result information 87 automatically supplied from the measuring instrument may be acquired by the acquisition unit 60. Further, although the case where the plurality of pieces of machining result information 87 are acquired by the acquisition unit 60 has been described as an example, the present invention is not limited thereto. For example, only one piece of machining result information 87 may be acquired by the acquisition unit 60. The acquisition unit 60 can acquire the machining result information 87 input in this manner. After the input of the machining result information 87 is completed, the operator presses the save button 89. When the save button 89 is pressed, the acquisition unit 60 stores the acquired machining result information 87 in the information storage unit 80.

Figure 4:
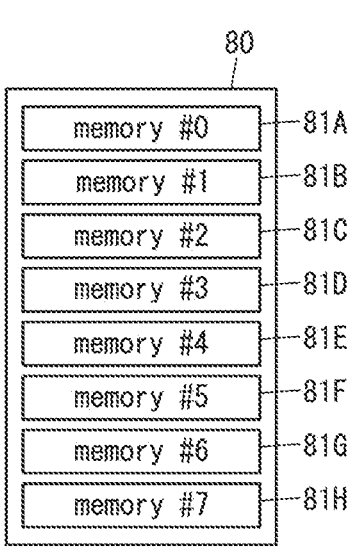
FIG. 4 is a diagram showing an example of a configuration of an information storage unit.

FIG. 4 is a diagram showing an example of a configuration of the information storage unit. As shown in FIG. 4, the information storage unit 80 includes a plurality of storage areas 81A to 81H. An example in which eight storage areas 81A to 81H are provided is shown in FIG. 4. The reference numeral 81 is used when describing the storage areas in general, and the reference numerals 81A to 81H are used when describing the individual storage areas. The names of the storage areas 81A to 81H are, for example, memory #0 to memory #7.

The setup information 79, the in-machining information 85, and the machining result information 87 that are acquired by the acquisition unit 60 at the time of on-site adjustment can be stored as the reference information 97A (see FIG. 6) in any of the plurality of storage areas 81.

In this instance, a case where information acquired at the time of inspection machining performed in on-site adjustment is used as the reference information 97A is described as an example, but the reference information is not limited thereto. A plurality of pieces of the in-machining information 85 and the machining result information 87 in the inspection machining that is performed after the on-site adjustment is performed can be used as the reference information 97A.

After the on-site adjustment is performed, a periodic inspection can be performed each time a predetermined periodic inspection time arrives. The setup information 79, the in-machining information 85, and the machining result information 87 acquired by the acquisition unit 60 at the time of the periodic inspection can be stored as the comparison information (information to be compared) 97B (see FIG. 6) in any of the plurality of storage areas 81.

The comparison unit 62 can compare the reference information 97A with the comparison information 97B. As described above, the reference information 97A includes the plurality of pieces of setup information 79, the plurality of pieces of in-machining information 85, and the machining result information 87. Further, similarly to the reference information 97A, the comparison information 97B also includes the plurality of pieces of setup information 79, the plurality of pieces of in-machining information 85, and the machining result information 87. That is, the reference information 97A includes a plurality of items. Further, the comparison information 97B includes a plurality of items corresponding to the plurality of items included in the reference information 97A. The comparison unit 62 can compare, for each item, the content of each item of the reference information 97A with the content of each item of the comparison information 97B.

Figure 5:
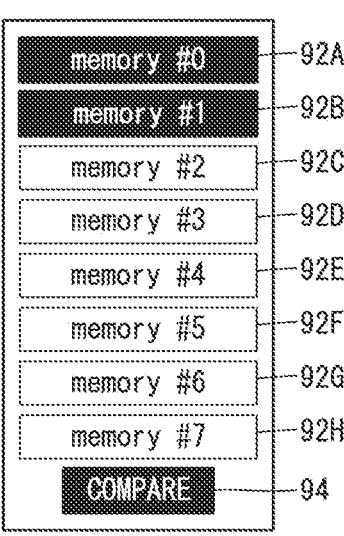
FIG. 5 is a diagram showing an example of the display screen of a display unit.

FIG. 5 is a diagram showing an example of the display screen of the display unit. As shown in FIG. 5, the display control unit 66 can display a plurality of selection buttons 92A to 92H, and a comparison button 94 on the display screen 72 of the display unit 68. The reference numeral 92 is used when describing the selection buttons in general, and the reference numerals 92A to 92H are used when describing the individual selection buttons. The selection buttons 92A to 92H are used to select the information stored in the storage areas 81A to 81H, respectively. Since the names of the storage areas 81A to 81H are memory #0 to memory #7, respectively, the storage area names of memory #0 to memory #7, for example, can be displayed on the selection buttons 92A to 92H, respectively.

The operator can select information stored in the storage area 81A by pressing the selection button 92A. In this instance, a case where the above-described reference information 97A is stored in the storage area 81A will be described as an example. When the selection button 92A is pressed, information for identifying the information stored in the storage area 81A, specifically, the date and time when the information stored in the storage area 81A is acquired, and the like, can be displayed on the display screen 72. Further, the operator can select information stored in the storage area 81B by pressing the selection button 92B. In this instance, a case where the above-described comparison information 97B is stored in the storage area 81B will be described as an example. When the selection button 92B is pressed, information for identifying the information stored in the storage area 81B, specifically, the date and time when the information stored in the storage area 81B is acquired, and the like, can be displayed on the display screen 72. When the selection button 92 is pressed, the display control unit 66 highlights the pressed selection button 92. After pressing the plurality of selection buttons 92, the operator presses the comparison button 94. When the comparison button 94 is pressed, the information stored in the selected storage areas 81 are compared by the comparison unit 62. In this instance, as described above, the storage area 81A and the storage area 81B are selected. Therefore, the comparison unit 62 compares the information stored in the storage area 81A with the information stored in the storage area 81B.

FIG. 6 is a diagram showing an example of display of a comparison result. As shown in FIG. 6, the display control unit 66 can display the comparison result obtained by the comparison unit 62, on the display screen 72 of the display unit 68. FIG. 6 shows an example of a case where the comparison result between the reference information 97A stored in the storage area 81A and the comparison information 97B stored in the storage area 81B is displayed. As described above, the name of the storage area 81A in which the reference information 97A is stored is memory #0. Therefore, memory #0, which is a storage area name 96A corresponding to the storage area 81A, is displayed on the display screen 72 of the display unit 68. The reference information 97A stored in the storage area 81A is displayed below the storage area name 96A (memory #0). As described above, the name of the storage area 81B in which the comparison information 97B is stored is memory #1. Therefore, memory #1, which is a storage area name 96B corresponding to the storage area 81B, is displayed on the display screen 72 of the display unit 68. The comparison information 97B stored in the storage area 81B is displayed below the storage area name 96B (memory #1). In this way, the display control unit 66 can display the reference information 97A together with the comparison information 97B on the display screen 72 of the display unit 68.

The display control unit 66 can distinguishably display, on the display screen 72 of the display unit 68, information which is among pieces of the comparison information 97B and for which a difference equal to or greater than a difference threshold occurs between the reference information 97A and the comparison information 97B. In the example shown in FIG. 6, among the pieces of comparison information 97B, the information for which the difference equal to or greater than the difference threshold occurs between the reference information 97A and the comparison information 97B is the information 79C about the material of the object to be machined W, the information 79G indicating the person in charge, the information 85B about the machining current, the information 85C about the machining speed, the information 85H about the machining date and time, the information 87A about the dimensions, and the information 87C about the surface roughness. Therefore, in the example shown in FIG. 6, these pieces of information among the pieces of comparison information 97B are distinguishably displayed. Although FIG. 6 shows an example of a case where the characters are distinguishably displayed by outline characters, the present invention is not limited thereto. Distinguishable display may be performed by changing the color of the characters. Alternatively, distinguishable display may be performed by displaying the characters in a blinking manner or the like.

In this instance, a description has been made of a case where, among the pieces of comparison information 97B, the information for which the difference equal to or greater than the difference threshold occurs between the reference information 97A and the comparison information 97B is distinguishably displayed on the display screen 72 of the display unit 68, but the present invention is not limited thereto. Only the information for which the difference equal to or greater than the difference threshold occurs between the reference information 97A and the comparison information 97B may be displayed on the display screen 72 of the display unit 68. That is, information for which the difference equal to or greater than the difference threshold does not occur between the reference information 97A and the comparison information 97B may not be displayed on the display screen 72 of the display unit 68, and only the information for which the difference equal to or greater than the difference threshold occurs between the reference information 97A and the comparison information 97B may be displayed on the display screen 72 of the display unit 68. In this case, since only the information for which the difference equal to or greater than the difference threshold occurs between the reference information 97A and the comparison information 97B is displayed on the display screen 72 of the display unit 68, it is not necessary to perform distinguishable display.

Figure 7A:
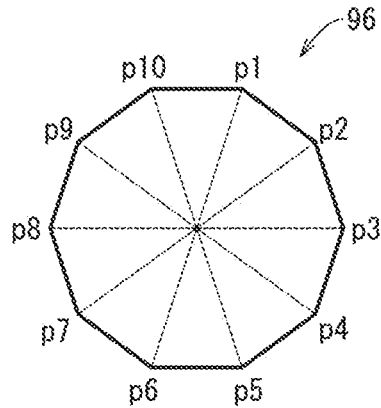
FIGS. 7A and 7B are diagrams showing examples of radar charts.
Figure 7B:
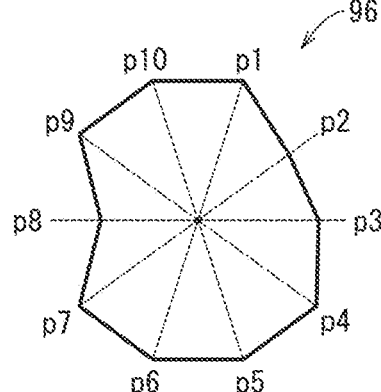

The display control unit 66 can display, on the display screen 72 of the display unit 68, a radar chart indicating a variation in the comparison information 97B with respect to the reference information 97A. FIGS. 7A and 7B are diagrams showing examples of the radar charts. FIG. 7A shows a radar chart 96 in which each item of p1 to p10 is 100%. The radar chart 96 corresponds to the contents of the reference information 97A. FIG. 7B shows an example of the radar chart 96 showing a variation in the comparison information 97B with respect to the reference information 97A. The p1 to p7 correspond to respective items of the in-machining information 85. Specifically, the p1 corresponds to the machining voltage, for example. The p2 corresponds to the machining current, for example. The p3 corresponds to the machining speed, for example. The p4 corresponds to the machining temperature, for example. The p5 corresponds to the dielectric working fluid pressure, for example. The p6 corresponds to the resistivity, for example. The p7 corresponds to the machining time, for example. The p8 to p10 correspond to respective items of the machining result information 87. Specifically, the p8 corresponds to the dimensions, for example. The p9 corresponds to the straightness, for example. The p10 corresponds to the surface roughness.

For example, when the variation of the machining voltage is less than ±1%, the p1 is not decreased. That is, when the variation of the machining voltage is, for example, less than ±1%, the p1 is set to 100%. When the variation of the machining voltage is, for example, ±1% or more and less than ±2%, the p1 is decreased by, for example, A1% with respect to 100%. When the variation of the machining voltage is, for example, ±2% or more and less than ±3%, the p1 is decreased by, for example, A2% with respect to 100%. When the variation of the machining voltage is, for example, ±3% or more and less than ±4%, the p1 is decreased by, for example, A3% with respect to 100%. When the variation of the machining voltage is, for example, ±4% or more, the p1 is decreased by, for example, A4% with respect to 100%. A2 is greater than A1, A3 is greater than A2, and A4 is greater than A3.

For example, when the variation of the machining current is less than ±1%, the p2 is not decreased. When the variation of the machining current is, for example, ±1% or more and less than ±2%, the p2 is decreased by, for example, B1% with respect to 100%. When the variation of the machining current is, for example, ±2% or more and less than ±3%, the p2 is decreased by, for example, B2% with respect to 100%. When the variation of the machining current is, for example, ±3% or more and less than ±4%, the p2 is decreased by, for example, B3% with respect to 100%. When the variation of the machining current is, for example, ±4% or more, the p2 is decreased by, for example, B4% with respect to 100%. B2 is greater than B1, B3 is greater than B2, and B4 is greater than B3.

For example, when the variation of the machining speed is less than ±2%, the p3 is not decreased. When the variation of the machining speed is, for example, ±2% or more and less than ±4%, the p3 is decreased by, for example, C1% with respect to 100%. When the variation of the machining speed is, for example, ±4% or more and less than ±6%, the p3 is decreased by, for example, C2% with respect to 100%. When the variation of the machining speed is, for example, ±6% or more and less than ±8%, the p3 is decreased by, for example, C3% with respect to 100%. When the variation of the machining speed is, for example, ±8% or more, the p3 is decreased by, for example, C4% with respect to 100%. C2 is greater than C1, C3 is greater than C2, and C4 is greater than C3.

For example, when the variation of the machining temperature is less than ±1%, the p4 is not decreased. When the variation of the machining temperature is, for example, ±1% or more and less than ±2%, the p4 is decreased by, for example, D1% with respect to 100%. When the variation of the machining temperature is, for example, ±2% or more and less than ±3%, the p4 is decreased by, for example, D2% with respect to 100%. When the variation of the machining temperature is, for example, ±3% or more and less than ±4%, the p4 is decreased by, for example, D3% with respect to 100%. When the variation of the machining temperature is, for example, ±4% or more, the p4 is decreased by, for example, D4% with respect to 100%. D2 is greater than D1, D3 is greater than D2, and D4 is greater than D3.

For example, when the variation of the dielectric working fluid pressure is less than ±2%, the p5 is not decreased. When the variation of the dielectric working fluid pressure is, for example, ±2% or more and less than ±4%, the p5 is decreased by, for example, E1% with respect to 100%. When the variation of the dielectric working fluid pressure is, for example, ±4% or more and less than ±6%, the p5 is decreased by, for example, E2% with respect to 100%. When the variation of the dielectric working fluid pressure is, for example, ±6% or more and less than ±8%, the p5 is decreased by, for example, E3% with respect to 100%. When the variation of the dielectric working fluid pressure is, for example, ±8% or more, the p5 is decreased by, for example, E4% with respect to 100%. E2 is greater than E1, E3 is greater than E2, and E4 is greater than E3.

For example, when the variation of the resistivity of the dielectric working fluid is less than ±3%, the p6 is not decreased. When the variation of the resistivity of the dielectric working fluid is, for example, ±3% or more and less than ±6%, the p6 is decreased by, for example, F1% with respect to 100%. When the variation of the resistivity of the dielectric working fluid is, for example, ±6% or more and less than ±9%, the p6 is decreased by, for example, F2% with respect to 100%. When the variation of the resistivity of the dielectric working fluid is, for example, ±9% or more and less than ±12%, the p6 is decreased by, for example, F3% with respect to 100%. When the variation of the resistivity of the dielectric working fluid is, for example, ±12% or more, the p6 is decreased by, for example, F4% with respect to 100%. F2 is greater than F1, F3 is greater than F2, and F4 is greater than F3.

For example, when the variation of the machining time is less than ±1%, the p7 is not decreased. When the variation of the machining time is, for example, ±1% or more and less than ±2%, the p7 is decreased by, for example, G1% with respect to 100%. When the variation of the machining time is, for example, ±2% or more and less than ±3%, the p7 is decreased by, for example, G2% with respect to 100%. When the variation of the machining time is, for example, ±3% or more and less than ±4%, the p7 is decreased by, for example, G3% with respect to 100%. When the variation of the machining time is, for example, ±4% or more, the p7 is decreased by, for example, G4% with respect to 100%. G2 is greater than G1, G3 is greater than G2, and G4 is greater than G3.

For example, when the variation of the dimensions is less than ±1%, the p8 is not decreased. When the variation of the dimensions is, for example, ±1% or more and less than ±2%, the p8 is decreased by, for example, H1% with respect to 100%. When the variation of the dimensions is, for example, ±2% or more and less than ±3%, the p8 is decreased by, for example, H2% with respect to 100%. When the variation of the dimensions is, for example, ±3% or more and less than ±4%, the p8 is decreased by, for example, H3% with respect to 100%. When the variation of the dimensions is, for example, ±4% or more, the p8 is decreased by, for example, H4% with respect to 100%. H2 is greater than H1, H3 is greater than H2, and H4 is greater than H3.

For example, when the variation of the straightness is less than ±1%, the p9 is not decreased. When the variation of the straightness is, for example, ±1% or more and less than ±2%, the p9 is decreased by, for example, I1% with respect to 100%. When the variation of the straightness is, for example, ±2% or more and less than ±3%, the p9 is decreased by, for example, I2% with respect to 100%. When the variation of the straightness is, for example, ±3% or more and less than ±4%, the p9 is decreased by, for example, I3% with respect to 100%. When the variation of the straightness is, for example, ±4% or more, the p9 is decreased by, for example, I4% with respect to 100%. I2 is greater than I1, I3 is greater than I2, and I4 is greater than I3.

For example, when the variation of the surface roughness is less than ±1%, the p10 is not decreased. When the variation of the surface roughness is, for example, ±1% or more and less than ±2%, the p10 is decreased by, for example, J1% with respect to 100%. When the variation of the surface roughness is, for example, ±2% or more and less than ±3%, the p10 is decreased by, for example, J2% with respect to 100%. When the variation of the surface roughness is, for example, ±3% or more and less than ±4%, the p10 is decreased by, for example, J3% with respect to 100%. When the variation of the surface roughness is, for example, ±4% or more, the p10 is decreased by, for example, J4% with respect to 100%. J2 is greater than J1, J3 is greater than J2, and J4 is greater than J3.

The item for which the substantial difference occurs can be grasped based on the radar chart 96. In addition, the degree of difference occurring in each item can be grasped based on the radar chart 96.

In the above, a description has been made of a case where, when a variation of the value of a certain item is within a certain range, the p1 to the p10 are each decreased by an amount determined in advance for the range, but the present invention is not limited thereto. The variation of the value of each item may be directly represented by the radar chart.

The comparison unit 62 can calculate a degree of similarity based on the comparison between the reference information 97A and the comparison information 97B. A degree of similarity Y can be calculated by the following expression (1), for example.

$$Y[\%]=100-(A+B+C+D+E+F+G+H+I+J) \tag{1}$$

A corresponds to the above-mentioned decrease in the p1. B corresponds to the above-mentioned decrease in the p2. C corresponds to the above-mentioned decrease in the p3. D corresponds to the above-mentioned decrease in the p4. E corresponds to the above-mentioned decrease in the p5. F corresponds to the above-mentioned decrease in the p6. G corresponds to the above-mentioned decrease in the p7. H corresponds to the above-mentioned decrease in the p8. I corresponds to the above-mentioned decrease in the p9. J corresponds to the above-mentioned decrease in the p10. Note that in the case of A+B+C+D+E+F+G+H+I+J≥100, Y=0.

Figure 8:
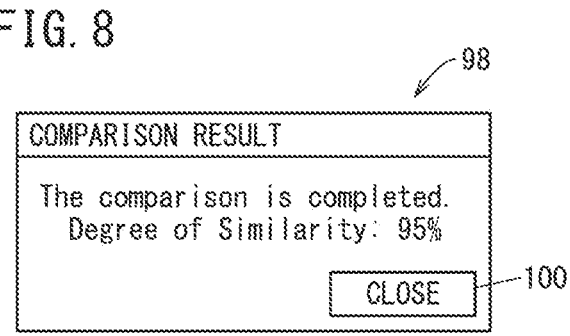
FIG. 8 is a diagram showing an example of display of the degree of similarity.

The display control unit 66 can display, on the display screen 72 of the display unit 68, the degree of similarity calculated by the comparison unit 62 as described above. FIG. 8 is a diagram showing an example of display of the degree of similarity. FIG. 8 shows an example in which the similarity is 95%. In the example shown in FIG. 8, the degree of similarity is displayed on a pop-up screen 98. A close button 100 can be displayed on the pop-up screen 98. When the close button 100 is pressed, the display control unit 66 terminates the display of the pop-up screen 98.

As described above, the storage unit 58 includes the table 82. FIG. 9 is a diagram showing an example of the table. In the table 82, a portion requiring maintenance or checking is defined according to a difference between the reference information 97A and the comparison information 97B. The determination unit 64 can determine the portion requiring maintenance or checking, based on the table 82 and the difference between the reference information 97A and the comparison information 97B. Based on the determination result obtained by the determination unit 64, the display control unit 66 can display information indicating the portion requiring maintenance or checking, on the display screen 72 of the display unit 68. For example, when the difference between the reference information 97A and the comparison information 97B occurs in the machining current, there is a possibility that deterioration or the like has occurred in the wiring. Therefore, when the difference between the reference information 97A and the comparison information 97B occurs in the current, for example, the wiring or the like is described in the table 82 as a portion to be maintained or checked. For example, when the difference between the reference information 97A and the comparison information 97B occurs in the machining current, wiring is indicated as a portion requiring maintenance or checking, which can promote the convenience of maintenance or the like.

As shown in FIG. 2, the controller 18 is capable of communicating with the information management device 88 via the communication unit 86. The information management device 88 manages information supplied from a plurality of the processing machines 10. Information indicating the comparison result and other information can be transmitted to the external device 90 via the communication unit 86 and the information management device 88. Communication between the information management device 88 and the external device 90 can be carried out via a network 93 such as the Internet. The external device 90 is, for example, a device of a company that provides a maintenance service for the processing machine 10. That is, the external device 90 is, for example, a device of a support provider 91. As examples of the external device 90, there may be cited a server, a mobile terminal, a personal computer, or the like, but the present invention is not limited thereto. As examples of the mobile terminal, there may be cited a smartphone, a tablet terminal, or the like, but the present invention is not limited thereto.

Next, operations of the processing machine according to the present embodiment will be described with reference to FIG. 10. FIG. 10 is a flowchart showing operations of the processing machine according to the present embodiment. FIG. 10 shows operations at the time of inspection machining executed after the inspection machining in which the reference information 97A has been acquired. The reference information 97A is already stored in the information storage unit 80.

In step S1, setup for performing inspection machining is performed. At the time of setup, the operator inputs the setup information 79. The acquisition unit 60 acquires the setup information 79 input by the operator, and stores the acquired setup information 79 in the information storage unit 80. Thereafter, the process transitions to step S2.

In step S2, inspection machining is performed. The inspection machining can be started by the operator pressing a start switch (not shown) or the like. A plurality of pieces of the in-machining information 85 indicating the machining state when inspection machining is performed on the object to be machined W are acquired by an acquisition unit 60. The acquisition unit 60 stores the acquired in-machining information 85 in the information storage unit 80. Thereafter, the process transitions to step S3.

In step S3, a machined product obtained by the inspection machining is measured using a measuring device. The machining result information 87 obtained by measuring the machined product is input by the operator. The acquisition unit 60 acquires the machining result information 87 input by the operator, and stores the acquired machining result information 87 in the information storage unit 80. In this manner, the setup information 79, the in-machining information 85, and the machining result information 87 are stored in the information storage unit 80 as the comparison information 97B. Thereafter, the process transitions to step S4.

In step S4, the comparison unit 62 compares the comparison information 97B with the reference information 97A. Thereafter, the process transitions to step S5.

In step S5, the display control unit 66 displays the comparison result obtained by the comparison unit 62, on the display screen 72 of the display unit 68. Upon doing so, the process shown in FIG. 10 is brought to an end.

In this way, according to the present embodiment, the storage unit 58 stores, as the reference information 97A, information including: the plurality of pieces of in-machining information 85 indicating the machining state when the inspection machining is performed on the object to be machined W; and the machining result information 87 obtained by measuring the machined product obtained by the inspection machining. Then, the acquisition unit 60 acquires the comparison information 97B including the plurality of pieces of in-machining information 85 and the machining result information 87 in the inspection machining executed after the inspection machining in which the reference information 97A has been acquired. Then, the comparison result between the comparison information 97B and the reference information 97A is displayed on the display screen 72 of the display unit 68. Therefore, according to the present embodiment, it is possible to accurately evaluate the result of the periodic inspection or the like.

Modified Embodiment

Although the preferred embodiment of the present invention has been described above, the present invention is not limited to the above-described embodiment, and various modifications can be made thereto within a range that does not depart from the essence and gist of the present invention.

Further, in the above-described embodiment, a case has been described in which the processing machine 10 is a wire electrical discharge machine, but the present invention is not limited thereto. The present invention can be applied to any processing machine 10. For example, the processing machine 10 may be a cutting machine or the like.

The embodiment described above can be summarized in the following manner.

The processing machine (10) is a processing machine that machines the object to be machined (W), the processing machine comprising: the information storage unit (80) configured to store, as the reference information (97A), information including the plurality of pieces of in-machining information (85A to 85H) indicating the machining state when inspection machining is performed on the object to be machined, and the machining result information (87A to 87C) obtained by measuring the machined product obtained by the inspection machining; the acquisition unit (60) configured to acquire the comparison information (97B) including a plurality of pieces of the in-machining information and the machining result information that are obtained in the inspection machining executed after the inspection machining in which the reference information has been acquired; the comparison unit (62) configured to compare the comparison information with the reference information; and the display control unit (66) configured to display the comparison result obtained by the comparison unit on the display unit (68). According to such a configuration, the result of the periodic inspection or the like can be accurately evaluated.

The display control unit may display at least information for which a difference equal to or greater than the difference threshold occurs between the reference information and the comparison information. According to such a configuration, it is possible to easily grasp a remarkable difference between the information acquired at the time of on-site adjustment or the like and the information acquired at the time of periodic inspection or the like.

The display control unit may display the comparison information, and distinguishably display information which is among pieces of the comparison information and for which a difference equal to or greater than the difference threshold value occurs between the reference information and the comparison information. According to such a configuration, since the distinguishable display is performed, it is possible to more easily grasp a remarkable difference between the information acquired at the time of the on-site adjustment or the like and the information acquired at the time of the periodic inspection or the like.

The display control unit may display the reference information together with the comparison information. According to such a configuration, it is possible to easily grasp the information acquired at the time of the on-site adjustment or the like and the information acquired at the time of the periodic inspection or the like.

The display control unit may display the radar chart (96) indicating a variation in the comparison information with respect to the reference information. According to such a configuration, it is possible to easily grasp a variation in the information acquired at the time of the periodic inspection or the like with respect to the information acquired at the time of the on-site adjustment or the like.

The comparison unit may calculate the degree of similarity based on the comparison between the reference information and the comparison information, and the display control unit may display the degree of similarity calculated by the comparison unit. According to such a configuration, the degree of similarity between the information acquired at the time of the on-site adjustment or the like and the information acquired at the time of the periodic inspection or the like can be grasped as a numerical value.

The processing machine may further include the table (82) in which a portion requiring maintenance or checking is defined according to the difference between the reference information and the comparison information, and the determination unit (64) configured to determine the portion requiring maintenance or checking, based on the table and the difference between the reference information and the comparison information, and the display control unit may display the information indicating the portion requiring maintenance or checking, based on the determination result obtained by the determination unit. According to such a configuration, it is possible to easily grasp a portion requiring maintenance or checking.

The reference information may be information acquired at the time of the on-site adjustment, and the comparison information may be information acquired at the time of the periodic inspection.

The in-machining information may include at least one of the information (85A) about the machining voltage, the information (85B) about the machining current, the information (85C) about the machining speed, the information (85D) about the machining temperature, the information (85E) about the dielectric working fluid pressure, the information (85F) about the resistivity, the information (85G) about the machining time, or the information (85H) about the machining date and time.

The machining result information may include at least one of the information (87A) about the dimensions, the information (87B) about the straightness, or the information (87C) about the surface roughness.

The reference information and the comparison information may each include the setup information (79A to 79G) which is the information about the setup of the inspection machining. According to such a configuration, it is possible to satisfactorily grasp the difference between the setup at the time of the on-site adjustment or the like and the setup at the time of the periodic inspection or the like.

The setup information may include at least one of the information (79A, 79B) about the wire electrode (12) used for the inspection machining, the information (79C, 79D) about the object to be machined, the information (79E) indicating the machining program used for the inspection machining, the information (79F) indicating the machining conditions when the inspection machining is performed, or the information (79G) indicating the person in charge of the inspection machining.

The processing machine may further include the communication unit (86) configured to transmit the comparison result to the information management device (88), or the device (90) of the support provider (91). According to such a configuration, it is possible to easily grasp the comparison result at the information management device or the device of the support provider.

The processing machine may further include the procedure manual storage unit (84) configured to electronically store the procedure manual used when the inspection machining is performed. According to such a configuration, it is possible to perform setup or the like for the inspection machining while easily referring to the procedure manual.

The processing machine may be a wire electrical discharge machine.

The invention claimed is:

1. A processing machine that machines an object to be machined, the processing machine comprising one or more processors that execute computer-executable instructions stored in a memory, wherein the one or more processors execute the computer-executable instructions to cause the processing machine to:

store, as reference information, information including a plurality of pieces of in-machining information indicating a machining state when first inspection machining is performed on the object to be machined, and first machining result information obtained by measuring a machined product obtained by the first inspection machining;

acquire comparison information including the plurality of pieces of in-machining information and second machining result information that are obtained in second inspection machining executed after the first inspection machining in which the reference information has been acquired;

compare the in-machining information included in the comparison information with the in-machining information included in the reference information or compare the second machining result information included in the comparison information with the first machining result information included in the reference information; and display the comparison information on a display screen, and distinguishably display, on the display screen, information for which a difference equal to or greater than a difference threshold occurs between the reference information and the comparison information, wherein the reference information is acquired at a time of the first inspection machining performed in on-site adjustment or at a time of the first inspection machining performed after on-site adjustment, the comparison information is acquired at a time of the second inspection machining performed in a periodic inspection, the in-machining information included in each of the reference information and the comparison information includes at least one of information about a machining voltage, information about a machining current, information about a machining speed, information about a machining temperature, information about a dielectric working fluid pressure, information about resistivity, information about a machining time, or information about a machining date and time, and the one or more processors execute the computer-executable instructions to cause the processing machine to display the reference information together with the comparison information.

2. The processing machine according to claim 1, wherein the one or more processors execute the computer-executable instructions to cause the processing machine to display a radar chart indicating a variation in the comparison information with respect to the reference information.

3. The processing machine according to claim 1, wherein the one or more processors execute the computer-executable instructions to cause the processing machine to calculate a degree of similarity based on a comparison between the reference information and the comparison information, and display the degree of similarity calculated.

4. The processing machine according to claim 1, further comprising a table in which a portion requiring maintenance or checking is defined according to a difference between the reference information and the comparison information, wherein the one or more processors execute the computer-executable instructions to cause the processing machine to determine the portion requiring the maintenance or the checking, based on the table and the difference between the reference information and the comparison information, and display information indicating the portion requiring the maintenance or the checking, based on a determination result obtained.

5. The processing machine according to claim 1, wherein at least one of the first machining result information or the second machining result information includes at least one of information about dimensions, information about straightness, or information about surface roughness.

6. The processing machine according to claim 1, wherein the reference information and the comparison information each include setup information that is information about setup of the first inspection machining and the second inspection machining, respectively.

7. The processing machine according to claim 6, wherein the setup information includes at least one of information about a wire electrode used for inspection machining, information about the object to be machined, information indicating a machining program used for inspection machining, information indicating machining conditions when inspection machining is performed, or information indicating a person in charge of inspection machining.

8. The processing machine according to claim 1, wherein the one or more processors execute the computer-executable instructions to cause the processing machine to transmit the comparison result to an information management device, or a device of a support provider.

9. The processing machine according to claim 1, wherein the one or more processors execute the computer-executable instructions to cause the processing machine to electronically store a procedure manual used when the inspection machining is performed.

10. The processing machine according to claim 1, wherein the processing machine is a wire electrical discharge machine.

11. A processing machine that machines an object to be machined, the processing machine comprising one or more processors that execute computer-executable instructions stored in a memory, wherein the one or more processors execute the computer-executable instructions to cause the processing machine to:

store, as reference information, information including a plurality of pieces of in-machining information indicating a machining state when first inspection machining is performed on the object to be machined, and first machining result information obtained by measuring a machined product obtained by the first inspection machining;

acquire comparison information including the plurality of pieces of in-machining information and second machining result information that are obtained in second inspection machining executed after the first inspection machining in which the reference information has been acquired;

compare the in-machining information included in the comparison information with the in-machining information included in the reference information or compare the second machining result information included in the comparison information with the first machining result information included in the reference information; and display the comparison information on a display screen, and distinguishably display, on the display screen, information for which a difference equal to or greater than a difference threshold occurs between the reference information and the comparison information, wherein the reference information is acquired at a time of the first inspection machining performed in on-site adjustment or at a time of the first inspection machining performed after on-site adjustment, the comparison information is acquired at a time of the second inspection machining performed in a periodic inspection, the in-machining information included in each of the reference information and the comparison information includes at least one of information about a machining voltage, information about a machining current, information about a machining speed, information about a machining temperature, information about a dielectric working fluid pressure, information about resistivity, information about a machining time, or information about a machining date and time, and the one or more processors execute the computer-executable instructions to cause the processing machine to display a radar chart indicating a variation in the comparison information with respect to the reference information.

* * * * *